Inventor:
Samuel C. W. Wilkinson

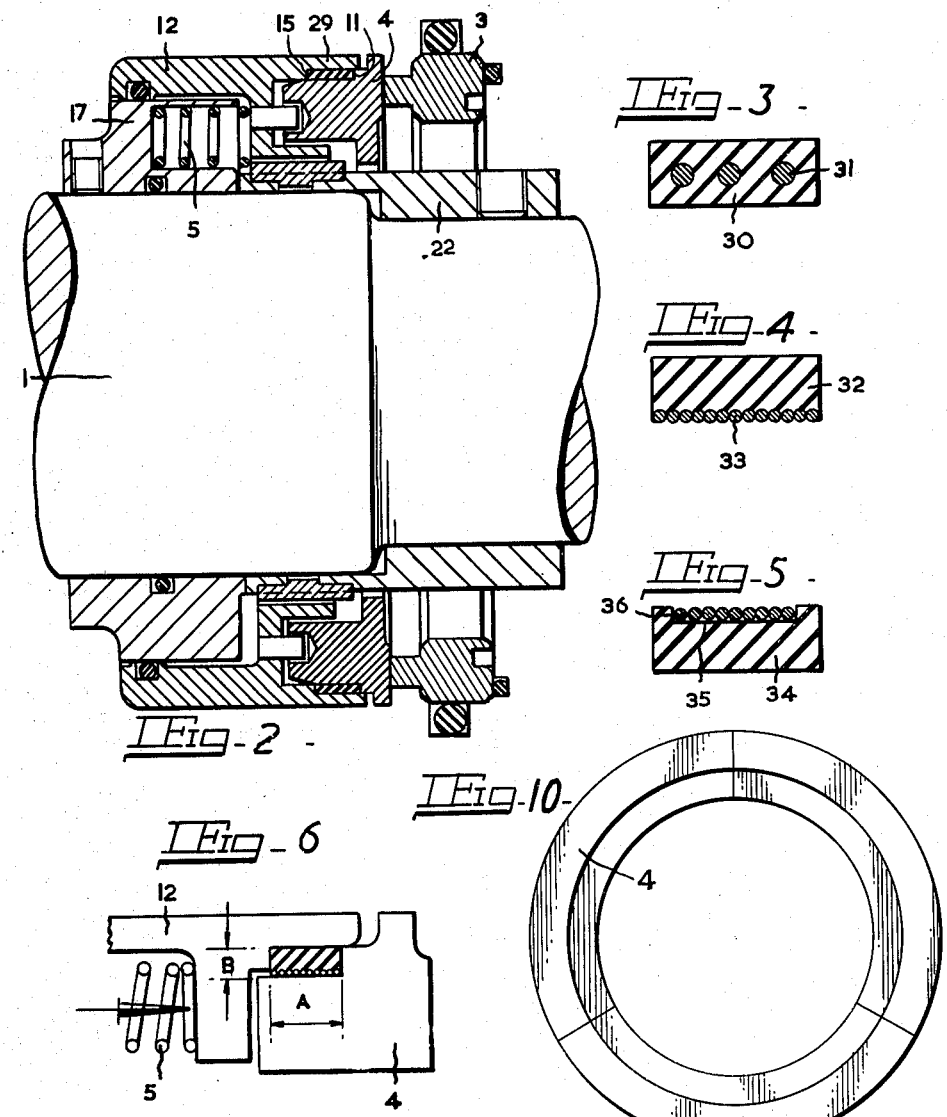

United States Patent Office 3,244,425
Patented Apr. 5, 1966

3,244,425
AXIALLY BIASED ROTARY FACE SEAL
Samuel Clifford Walter Wilkinson, Cookham, England, assignor to Crane Packing Limited, Slough, England, a British company
Filed Sept. 21, 1962, Ser. No. 225,238
Claims priority, application Great Britain, Sept. 23, 1961, 34,156/61
7 Claims. (Cl. 277—92)

This invention relates to rotary mechanical seals of the kind designed to form a fluid-tight seal between relatively rotatable members, for example between the driving shaft of a fluid pump and the pump housing. The invention relates in particular to face seals, that is to say, seals in which the rubbing faces of the relatively rotating parts of the seal extend radially.

It is known to make such seals in split form, that is to say, the ring-like seal face members that are in mutual rubbing contact with one another and are therefore subject to wear, requiring replacement after a period of time, are split into two or more arcuate sections. This means that they can be assembled onto the shaft without requiring access to a free end of the shaft, thus leading to a substantial reduction in the amount of dismantling required to replace the worn members.

Although it simplifies the replacement of worn members, this split form of construction raises certain extra difficulties. For example, the efficient working of the seal depends on the smoothness and perfect flatness of the rubbing faces of the two members, and where these are split into two or more sections it is difficult to keep the sections co-planar with the high degree of accuracy required. Furhermore, there is a danger of fluid escaping between the adjacent ends of the different sections.

It is true that the pressure of the fluid, above atmospheric, will tend to hold the sections together, but in the case of the rotating seal face member centrifugal force, especially with high rotational speeds may overcome the effects of fluid pressure, and may actually cause the sections to move radially outwards, separating their ends.

A still further drawback of split seals is the difficulty experienced in holding the sections of the split members together round the shaft while endeavouring to replace them in the stuffing box of the pump or other apparatus, especially where the access is restricted anyway.

A further drawback in practice with such seals is that the sections of the seal face members may be difficult to withdraw for replacement when necessary, where they are tightly held in a recess or counterbore in another part of the assembly.

It is an aim of the invention to provide an improved construction for the split form of rotary mechanical face seal.

According to the invention there is now proposed a rotary mechanical face seal of the kind comprising a rotating seal face member associated with a shaft or other rotating member and resiliently urged axially into face-to-face contact with a non-rotating seal face member associated with a housing or other stationary part, in which at least one of the seal face members is split into arcuate sections so that it can be removed or replaced without access to an end of the shaft or other rotating member, and distinguished by the feature that the split seal face member is sealed into a carrier or housing that receives it by means of a strip of resilient or expandable material in the form of a broken or interrupted ring and the axial thrust by which the split seal face member is urged against the other is transmitted to that split member through the strip in such a manner that this thrust causes an inward radial force on the split member, urging its sections together.

The strip may be of rubber or similar resilient material. It may be of round or rectangular cross-section, or it could taper in cross-section towards or away from the counterbore in the carrier. Where the strip is in the form of a ring cut from a cone, it will be engaged by conical surfaces on both the seal face member and its carrier.

In assembling the split seal face member into its housing or carrier the user may wrap the strip around the sections to hold them together before inserting them in the carrier or housing. Alternatively the strip can be inserted first into the carrier or housing and then the sections of the split member are pushed in.

According to a further feature of the invention the strip or band is provided on its inside face with an adhesive surface by which it can be caused to stick to the sections of the seal face member.

The invention will now be further described by way of example with reference to the accompanying drawing, in which:

FIGURE 2 shows a modified arrangement in which the sealing member of round section of FIGURE 1 is replaced by one of rectangular cross-section;

FIGURES 3, 4 and 5 show alternative forms of rectangular-section ring for use with seal assembly of FIGURE 2;

FIGURE 6 is a diagrammatic drawing to show the operation of the ring of FIGURES 2 to 5;

FIGURE 10 is an end view of the rotating seal face member 4 of FIGURE 1.

Figures 1, 7, 8, 9:
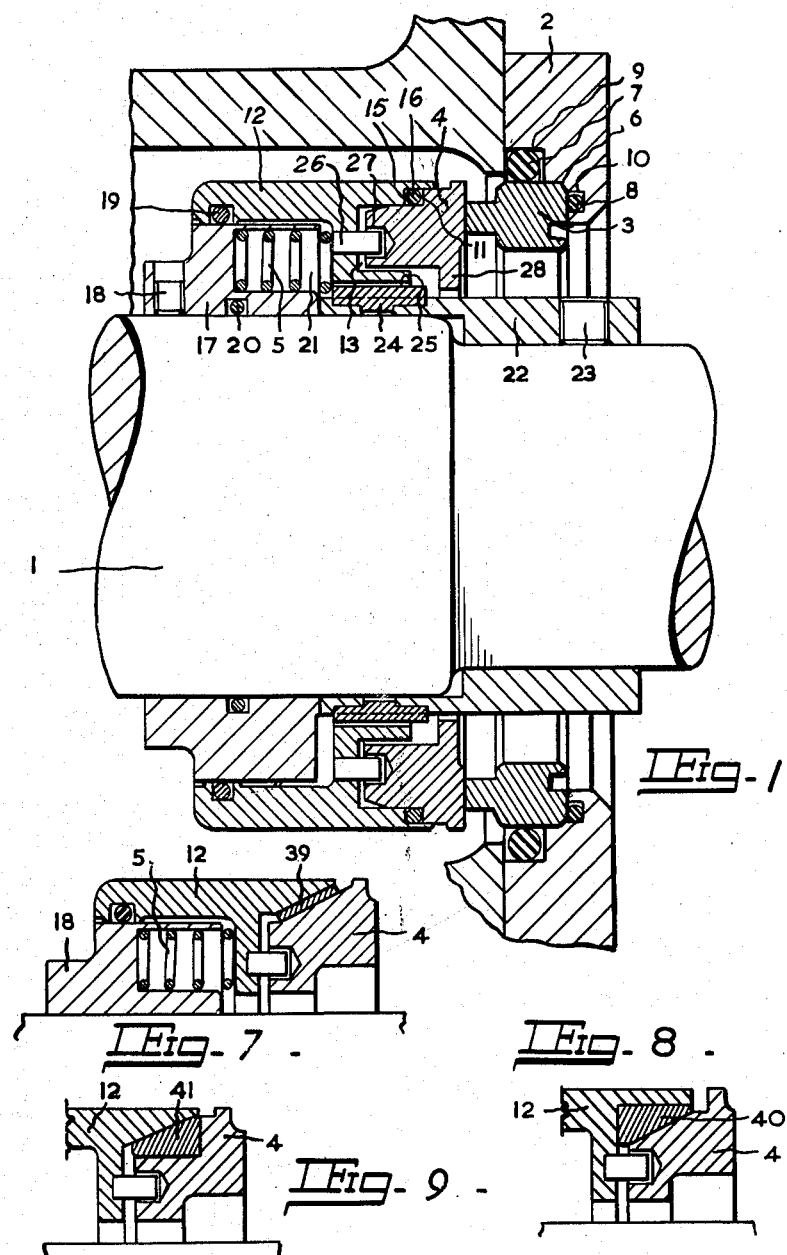
FIGURE 1 shows a face seal assembly in which the rotating seal face member is held in its carrier and the stationary member in its housing in the manner according to the invention.
FIGURE 7 shows a modified arrangement in which the sealing ring is of conical section.
FIGURES 8 and 9 show further modifications in which the sealing ring is of triangular section.

Referring first to FIGURE 1, a shaft 1 is mounted for rotation in a housing 2, and the housing is to be sealed against the escape of fluid from it around the shaft 1. The seal assembly for this purpose comprises a stationary seal face member 3 in the form of a ring of suitable material such as metal or carbon secured in the housing 2, and a rotating seal face member 4 mounted to rotate with the shaft 1. The rotating member 4 is urged by means of circumferentially spaced springs of which one is visible at 5, in an axial direction to press against and form a fluid-tight seal with the member 3. Seals of this general kind are well known.

Each of the seal face members 3 and 4 is split into two or more arcuate sections so that it can be replaced, when it becomes worn, without it being necessary to have access to the end of the shaft 1. This is a great advantage, and in fact it is essential in many situations, but it does lead to added difficulties, especially the possibility of leakage between the mutually abutting ends of the adjacent sections.

In the arrangement shown in FIGURE 1 the stationary seal face member 3 is received in a counterbore 6 in the housing 2 and is sealed into it by two O-rings 7 and 8, received in annular grooves 9 and 10, respectively, of rectangular cross-section. The O-ring 7 has the normal fluid-sealing function for which O-rings are generally used but also has the important additional function of squeezing together the sections of the member 3. This is achieved by making the diameter of the base of the groove 9 smaller than the outer diameter of the O-ring 7 in its free state and making the radial depth of the groove less than that of the O-ring. The O-ring is thus forced to contract onto the member 3, urging its sections together.

To allow it to be assembled onto the shaft the O-ring 7 has to be broken or interrupted at some point in its periphery and it is cut through at right-angles to its cross-section so that there is no tendency for one of the cut ends to ride over the other, as would happen if the ring were to be cut at an angle, as is frequently done. Furthermore the inward contraction of the ring 7 caused by the small diameter of the groove 9 not only presses the ring onto the member 3 but also presses the ends of the ring itself together to prevent leakage at this point.

The axial depth of the groove 10 is likewise less than the thickness of the O-ring 8, so that this O-ring forms a resilient bed for the member 3, taking the thrust of the axially acting springs 5, and its resilience allows for any minor distortion or surface roughness, letting the active rubbing surfaces of the different sections of the seal face member be truly co-planar.

The rotating seal face member 4 has a step in its outside diameter, forming a shoulder 11 and it is received in a carrier 12 of generally sleeve-like shape in the face of which is an annular recess 13 to receive the rear end of the member 4. The outer diameter of this recess is likewise stepped to form a shoulder 15, and in the space between the shoulders 11 and 15 is inserted an O-ring 16. The outer diameter of the O-ring in its free state is slightly greater than that of the space in which it is received, so when the seal is assembled the O-ring is forced down onto the seal face member to grip it tightly and hold its sections together. Furthermore, it will be noted that the axial thrust of the springs 5 is transmitted from the carrier 12 to the seal face member 4 through the O-ring 16. The O-ring 16 is of resilient material such as natural or synthetic rubber and is consequently fairly easily deformed but not easily compressed. The axial thrust tends to make it contract axially and therefore expand radially, and this further increases the radial force with which the O-ring 16 squeezes the seal face member 4. The greater the axial force with which the seal face members are urged together, the greater is this auxiliary radial force with which the sections of the member 4 are held together.

It should be made clear that the O-rings 8 and 16, like the O-ring 7, are not closed loops but are cut through radially at some point. These rings can therefore be removed and replaced, like the members 3 and 4, without it being necessary to have access to the end of the shaft. On assembly of parts, the joint in the ring should be placed at a circumferential point midway between the joints in the associated seal face member.

The carrier 12 is axially movable on a sleeve 17 which is secured to the shaft 1 by a grub-screw 18. The carrier 12 is sealed to the sleeve by an O-ring 19 and the sleeve is sealed to the shaft by an O-ring 20, both of these O-rings being received in grooves and behaving in a normal and well-known manner.

The sleeve 17 has a number of spaced recesses, of which one is visible at 21, to receive the springs 5, which press against the rear face of the carrier 12, which can move axially with respect to the sleeve as the members 3 and 4 wear.

To drive the rotating seal face member, i.e. to ensure that it rotates with the shaft, there is a further sleeve 22 secured to the shaft 1 by a grub-screw 23. Keys 24 spaced around the periphery of one end of the sleeve 22 engage in keyways 25 cut in the inner edge of the carrier 12. The carrier 12 is provided with axially extending pins 26 which engage recesses 27 in the rear face of the seal face member 4 to transmit the drive to that member.

The sleeve 22 has, however, a further function. The tight grip of the O-ring 16 on the seal face member 4 makes it difficult to withdraw that member for replacement, especially when space around the seal assembly is very limited, as is usually the case. The keys 24 are located axially in the sleeve 22 and the seal face member 4 is provided with an inwardly directed flange 28 which has a smaller inside diameter than the circle embracing the tips of the keys 24. To remove the seal face member 4 (after removal of part of the housing 1, and the seal face member 3) one slacks off the grub-screw 23 and moves the sleeve 22 axially to the right as viewed in FIGURE 1. By the engagement of the keys 24 with the flange 28 the seal face member 4 is forced out of the carrier 13 and can be removed for replacement.

Turning now to FIGURE 2, this shows a seal assembly of construction closely similar to that of FIGURE 1 and the same reference numerals have been used where applicable. However, in the interests of clarity, many of the reference numerals not necessary to an understanding of the embodiment of FIGURE 2 have been omitted. The important difference in the embodiment of FIGURE 2 is that the O-ring 16 of round section is replaced by a strip 29 of rectangular section which entirely fills the space between the shoulders 11 and 15. This is, like the O-ring 16 of FIGURE 1, broken at one point and is of rubber or like resilient material. Like the O-ring 16 it takes all the axial thrust of the springs 5, and this thrust is converted into an inward radial thrust on the sections of the seal face member 4.

According to a feature of the invention the inner surface of the strip 29 is coated with adhesive. Then, to insert the seal face member 4 in the carrier 12, the sections of the member 4 are first assembled together and the strip 29 is wrapped around them. It sticks to the sections and holds them together, simplifying the task of inserting them into the recess 13.

The strip 29 may be made in a roll of indefinite length, and it is cut off as required for ecah particular job, the length of the strip cut off being such that its ends just butted together when it is wrapped round the member. Conveniently it can be wrapped round first with the adhesive coating protected and then cut off. It is then taken off and the protective layer over the adhesive is removed, and it is wrapped onto the member again, this time sticking to it. Its thickness is such that, after the wrapping, its outer diameter is greater than that of the recess to receive it in the carrier 12, so that in the assembled condition the carrier exerts an inward compressive force that is transmitted to the sections of the member 4, helping to hold the sections together against the separating action of centrifugal force.

FIGURE 3 shows to a larger scale a form of strip 30 like the strip 29 but incorporated reinforcing cords 31 embedded in it. These cords may be of synthetic or natural fibre, or metallic or synthetic resin monofilaments. FIGURE 4 shows an alternative arrangement in which a strip 32 has cords or strands 33 reinforcing its inner edge.

The strip shown at 34 in FIGURE 5 is similar to those of FIGURES 3 and 4 but instead of the reinforcement being embedded in the strip it is wound off separately afterwards. The outer surface of the strip is provided with a groove 35 to receive the reinforcing cords, and whilst the strip must be interrupted at one point to enable it to be wrapped round the seal face member 4, the reinforcement can be in the form of a continuous cord 36 wound round the strip after the strip is in place on the member 4, but before the member 4 is inserted in the carrier 12. The reinforcement can be wound rightly to pre-stress the strip and give an additional force holding the sections of the member 5 together.

Where the strip is of approximately rectangular cross-section, as in FIGURES 2 to 5, and is of a material such as rubber, that isc easily deformable but substantially incompressible, and where, as in FIGURE 2 it transmits the axial thrust between a shoulder on the carrier and a shoulder on the seal face member, the resulting axial compression of the strip causes radial expansion which assists in sealing the members together. In fact the rubber behaves as it were a fluid within the space in which it is confined. It can be shown that, with the strip of very soft rubber, and therefore assuming its behaviour to be that of a fluid, the compressive force tending to hold the butting ends of the two sections of the seal face member together against the separating action of centrifugal force is proportional to the total axial thrust of the springs multiplied by the ratio of the area of the rubber (looking axially) to the projected area of the rubber on a diametral plane. With reference to FIGURE 6, it can be shown that, for a given diameter of seal, this ratio is proportional to the ratio of the axial width A of the cross-section to the thickness B of the cross-section.

The arrangements described above and below with reference to the sealing of the rotating seal face member 4 in the carrier 12 may be applied equally well to the sealing of a split non-rotating seal face member in its housing.

FIGURE 7 shows a modification in which the rectangular strip is tilted, so as to form a section from the wall of a thin-walled cone. This strip, shown at 39, engages corresponding conical surfaces on the inside of the carrier 12 and the outside of the seal face member 4 and as a result of its inclination the axial thrust which it transmits between the members 12 and 4 produces an inward radial component of force which squeezes the sections of the member 4 together.

FIGURE 8 shows a further variant in which a strip 40 having a cross-section the shape of a right-angled triangle is received in a cylindrical recess and against a radial face in the carrier 12, but engages a conical surface on the seal face member 4. FIGURE 9 shows an inversion of this with a conical engaging surface in the carrier 12 and a right-angled recess in the member 4 the strip 41 being of appropriate cross-section. In each of these cases, as in that of FIGURE 7, the presence of a conical surface through which the axial thrust is transmitted results in an inward radial force on the member 4.

I claim:
1. A rotary mechanical face seal assembly comprising:
   first and second relatively rotatable bodies;
   a first seal face member associated with one of said bodies;
   a second seal face member associated with the other of said bodies, each of said seal face members being of annular shape and said members being in mutual face-to-face engagement over radial faces thereof, said first seal face member comprising a series of arcuate sections in end-to-end abutting relationship;
   a carrier, said carrier being of annular shape;
   means sealing said carrier to that body with which said first seal face member is associated, said carrier having formed therein an internal counterbored recess, said first seal face member having formed on the external surface thereof a shoulder, and said first seal face member being received in said carrier so that said shoulder and counterbore define between them an annular space of rectangular cross-section;
   a sealing ring of resiliently deformable but substantially incompressible material filling said space;
   and resilient means acting axially on said carrier in a direction to urge said carrier axially towards said second seal face member, said second seal face member and said carrier, in the absence of said sealing ring, being freely axially moveable with respect to each other, said sealing ring constituting the sole medium for transmitting axial forces of said resilient means from said carrier to said second seal face member for biasing said seal face members into engagement with each other.
2. A rotary mechanical face seal as set forth in claim 1 including reinforcing strands embedded in said sealing ring.
3. A rotary mechanical face seal as set forth in claim 1 including an adhesive layer on the inner surface of said sealing ring.
4. A rotary mechanical face seal comprising:
   first and second bodies relatively rotatable about an axis;
   a carrier associated with said first body, said carrier being of annular shape and movable with respect to said first body in the direction of said axis;
   means sealing said carrier to said first body;
   means defining an external annular recess in said carrier;
   a first annular seal face member, said member being received in said annular recess;
   an annular sealing ring formed of a strip of resilient deformable but substantially incompressible material, said sealing ring being disposed between the external surface of said first seal face and the internal surface of said recess, said first seal face member comprising a plurality of arcuate sections in end-to-end abutting relationship;
   a second annular seal face member;
   means sealing said second member to said second body, said first and second seal face members being in mutual face-to-face rubbing contact over radial faces thereof;
   and resilient means acting axially between said first body and said carrier to urge said carrier axially toward said first seal face member, said first seal face member and said carrier, in the absence of said annular sealing ring being freely axially moveable relative to each other, said sealing ring constituting the sole medium for transmitting axial force of said resilient means from said carrier to said first seal face member for biasing said seal face members into engagement with each other.
5. A rotary mechanical face seal as set forth in claim 4 wherein said internal annular recess in said carrier is defined by a counterbore terminating in an internal shoulder and the external surface of said first seal face member bears a shoulder, and wherein the said sealing ring is confined between said shoulders.
6. A rotary mechanical face seal as set forth in claim 4 wherein said sealing ring is of rectangular cross-section.
7. A rotary mechanical face seal as set forth in claim 4 wherein said sealing ring comprises a strip of material wound around said first seal face member, and reinforced by a cord wound around said strip.

References Cited by the Examiner
UNITED STATES PATENTS

| | | | |
|---|---|---|---|
| 2,245,106 | 6/1941 | Karlberg | 277—92 |
| 2,249,424 | 7/1941 | Hannington | 20—69 |
| 2,697,623 | 12/1954 | Mosher | 277—179 |
| 2,921,806 | 1/1960 | Carter | 277—93 |
| 3,068,015 | 12/1962 | Roubal | 277—81 |
| 3,072,414 | 1/1963 | Porges | 277—81 |
| 3,090,627 | 5/1963 | Tankus | 277—91 |
| 3,123,367 | 3/1964 | Brummer et al. | 277—179 |

LAVERNE D. GEIGER, *Primary Examiner.*
SAMUEL ROTHBERG, *Examiner.*
E. DOWNS, J. MEDNICK, *Assistant Examiners.*